United States Patent [19]

Fenwick

[11] Patent Number: 4,653,938
[45] Date of Patent: Mar. 31, 1987

[54] SELF-ADJUSTING BALL BEARING CAGE

[75] Inventor: James R. Fenwick, Chatsworth, Calif.

[73] Assignee: Rockwell International Corporation, El Segundo, Calif.

[21] Appl. No.: 256,642

[22] Filed: Apr. 23, 1981

[51] Int. Cl.⁴ .................................... F16C 33/38
[52] U.S. Cl. .................................... 384/533
[58] Field of Search ............ 308/188, 201, 189 R, 308/193, 195, 196; 384/533, 534, 523

[56] References Cited

U.S. PATENT DOCUMENTS

| 887,356 | 5/1908 | Straub | 308/201 |
| 1,467,063 | 9/1923 | Nelson | 308/201 |

FOREIGN PATENT DOCUMENTS

| 41015 | 8/1914 | Sweden | 308/201 |
| 114151 | of 1918 | United Kingdom | 308/201 |

Primary Examiner—Lenard A. Footland
Attorney, Agent, or Firm—H. Fredrick Hamann; Harry B. Field; David C. Faulkner

[57] ABSTRACT

A ball bearing assembly comprising first and second race members 4 and 6 formed with concave ball engaging surfaces 22 and 24 cooperating to define a path of movement 26 for balls 16, 18 and 20 located therebetween and a cage member 8 interposed between said race members 4 and 6 having a plurality of apertures 42, 44 and 46 formed therein, each containing a respective one of said balls 16, 18 and 20 and configured to engage said balls 16, 18 and 20 at an angle to said path of movement 26.

2 Claims, 7 Drawing Figures

U.S. Patent     Mar. 31, 1987     4,653,938
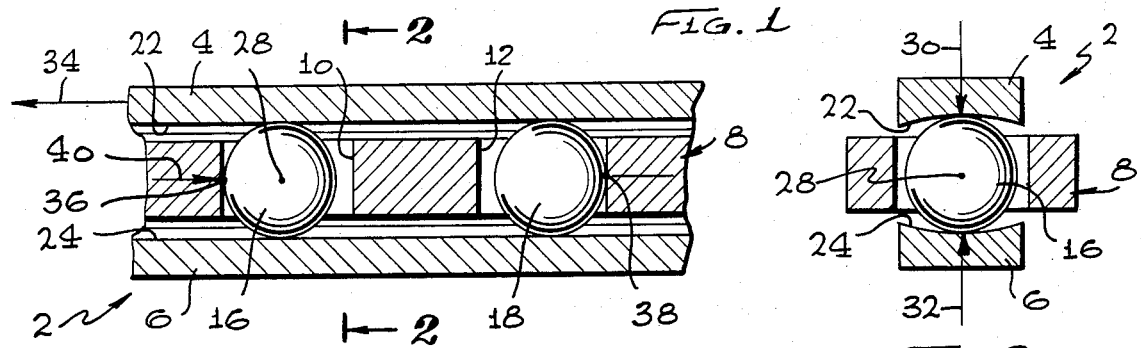
FIG. 1
FIG. 2
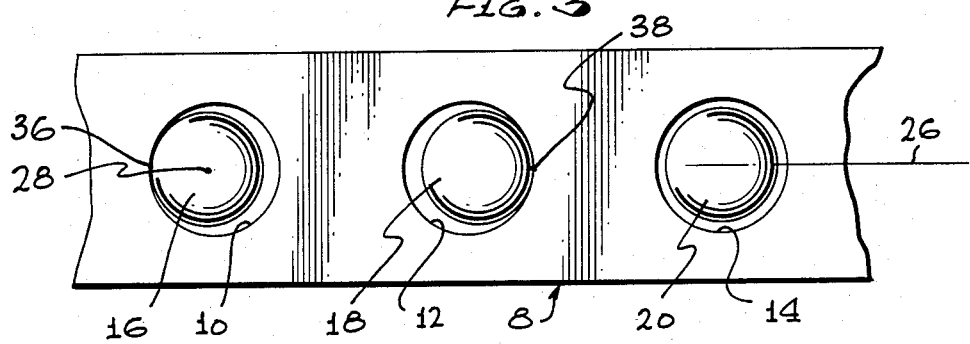
FIG. 3
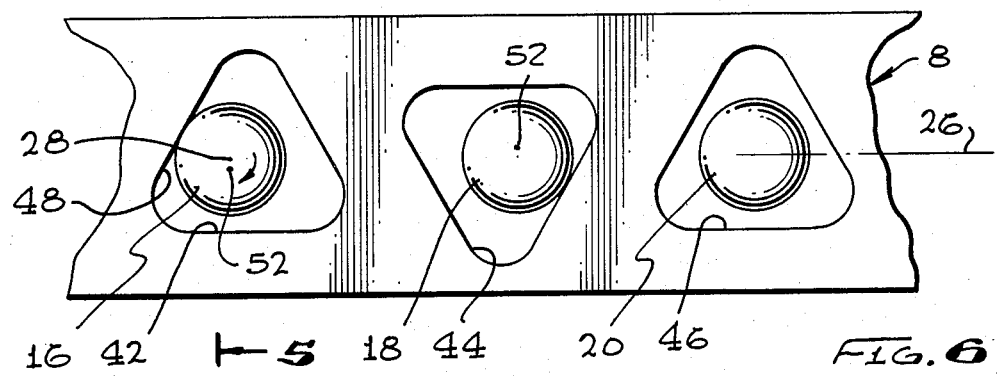
FIG. 4
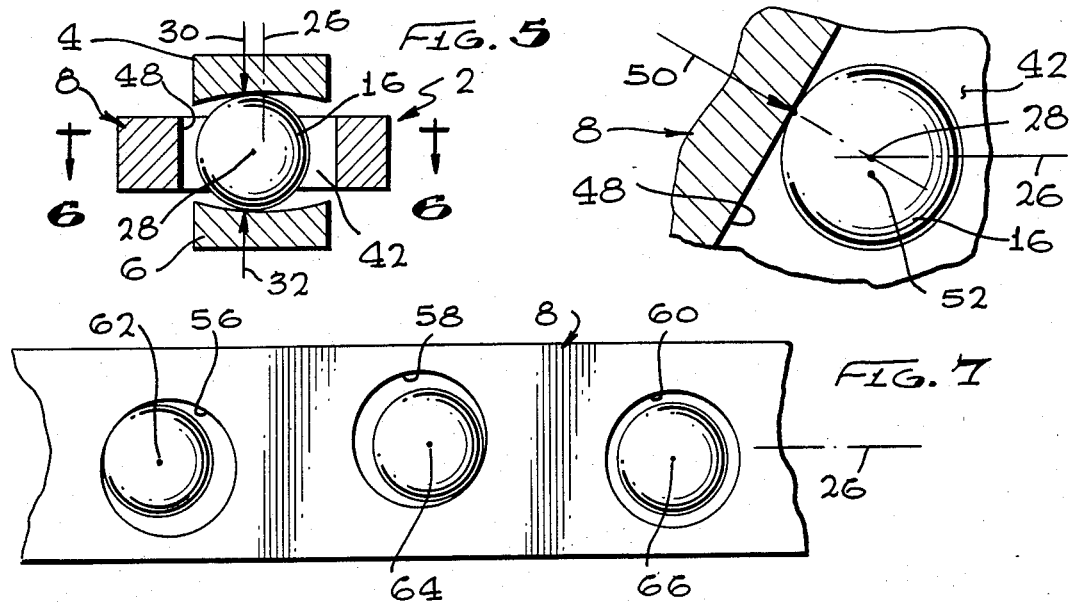
FIG. 5
FIG. 6
FIG. 7

SELF-ADJUSTING BALL BEARING CAGE

BACKGROUND OF THE INVENTION

1. Field of the Invention

This invention relates to ball bearings and is particularly directed to means for reducing friction and wear resulting from ball migration.

2. Description of the Prior Art

Ball bearings have been in use for many years to reduce friction between a first rotating member, such as a wheel, and a second member, such as a shaft, which may be stationary or may be rotating at a different rate than the first member. Ball bearings generally comprise inner and outer concentric race, each connected to a respective one of the members, and a plurality of balls, interposed between the race and maintained in place by a bearing cage, which is a strip of metal or other suitable material formed with a plurality of apertures of slightly greater diameter than the balls, with each of the balls being positioned in a respective one of the apertures.

In use, the motion of the rotating member is applied, through the adjacent race, to cause the balls to roll between the race, and the cage is carried with the balls. Unfortunately, due to individual differences, the balls tend to migrate in the cage apertures and will rub against the cage, causing increased friction and wear on the cage. Thus, especially in high-speed, high-load bearing packages, cage life presents a continuing problem. Numerous techniques have been proposed, heretofore, to reduce or eliminate cage wear. However, none of the prior art techniques have been entirely satisfactory.

BRIEF SUMMARY AND OBJECTS OF INVENTION

These disadvantages of the prior art are overcome with the present invention and a bearing cage is presented which counteracts migration of the balls and greatly reduces friction and cage wear.

The advantages of the present invention are preferably attained by providing a bearing cage having apertures formed to engage the balls at an angle to the path of movement of the balls. This angular engagement causes a migrating ball to be forced slightly off its rolling path, which creates redundant opposed torques between the ball and the race requiring one of the ball-race contact points to slip torsionally. The ball-cage force vector passes through the geometric center of the ball, which is not in the same plane as the ball-race contact points. This causes additional torque which produces a preferential slip that relieves the ball-cage force and allows the ball to return to a neutral rolling condition, thereby relieving rubbing and wear between the ball and cage.

Accordingly, it is an object of the present invention to provide improved ball bearings.

Another object of the present invention is to provide ball bearing assemblies having reduced friction.

A further object of the present invention is to provide ball bearing assemblies having prolonged cage life.

A specific object of the present invention is to provide ball bearing asseablies wherein the cage apertures are formed to engage the balls at an angle to the path of movement of the balls.

These and other objects and features of the present invention will be apparent from the following detailed description, taken with reference to the figures of the accompanying drawing.

BRIEF DESCRIPTION OF THE DRAWINGS

FIG. 1 is a vertical section through a portion of a typical prior-art ball bearing assembly;

FIG. 2 is a transverse section through the bearing assembly of FIG. 1, taken on the line 2—2 thereof;

FIG. 3 is a plan view of the bearing assembly of FIG. 1, with the outer race removed for clarity;

FIG. 4 is a view, similar to that of FIG. 3, showing a ball bearing assembly having a bearing cage embodying the present invention;

FIG. 5 is a transverse section through the bearing assembly of FIG. 4 taken on the line 5—5 thereof;

FIG. 6 is a horizontal section through the bearing assembly of FIG. 5 taken on the line 6—6 thereof; and FIG. 7 is a view, similar to that of FIG. 4, showing an alternative form of bearing cage embodying the present invention.

DETAILED DESCRIPTION OF THE PREFERRED EMBODIMENT

A typical, prior-art ball bearing assembly is shown in FIG. 1, indicated generally at 2, having an outer race 4, an inner race 6, a bearing cage 8 formed with a plurality of apertures, as seen at 10, 12 and 14, and a plurality of ball bearings, shown at 16, 18 and 20, each positioned in a respective one of the apertures 10, 12 and 14 of the cage 8. As best seen in FIG. 2, the race 4 and 6 are formed with concave ball-engaging surfaces 22 and 24, which urge the balls 16, 18 and 20 into alignment with the rolling axis of the bearing, indicated at 26 in FIG. 3. With this aligning action, it will be seen that load forces from the race 4 and 6 will be applied through the center 28 of the ball, as indicated by arrows 30 and 32 in FIGS. 1 and 2. When one of the races is moved, as represented by arrow 34 extending from race 4 in FIG. 1, this causes the balls 16, 18 and 20 to roll and engage the cage 8. Due to individual differences, the balls 16, 18 and 20 tend to migrate within their respective apertures 10, 12 and 14, with some tending to engage the cage 8 at the forward edge of the aperture, as shown by ball 16 in FIGS. 1 and 3, and some to engage cage 8 at the rearward edge of the aperture as shown by ball 18. In either case, however, the aligning action of the race surfaces 22 and 24 causes the balls 16 and 18 to engage the cage 8 at a constant point, as seen at points 36 and 38 in FIGS. 1 and 3, and this force is also applied through the center 28 of the ball, as indicated by arrow 40 in FIG. 1. Furthermore, as seen in FIG. 3, it is conventional for the apertures 10, 12 and 14 of the cage 8 to be formed circular, with the centers of the apertures 10, 12 and 14 coinciding with the rolling axis 26 of the cage 8. This tends to reinforce the aligning of the balls 16, 18 and 20 and increases the friction and wear at the ball-cage contact points 36 and 38. As wearing of the cage 8 and balls 16, 18 and 20 occurs, the balls 16 and 18 tend to bind against the ball-cage contact points 36 and 38 and cease rolling, which causes further increase in friction and wear at the points 36 and 39 until the forces tending to roll the balls 16 and 18 exceed the friction at points 36 and 38, causing the balls 16 and 18 to slide.

To overcome this problem, the present invention proposes to modify the cage 8, as shown in FIG. 4 and 7, so that the cage apertures engage the balls at an angle to the rolling axis. As seen in FIG. 4, the cage 8 is formed with a plurality of alternately inverted triangular apertures 42, 44 and 46, each receiving a respective one of the balls 16, 18 and 20. As seen in FIGS. 4, 5 and 6, when ball 16 migrates forward, it engages wall 48 of triangular aperture 42, which applies a force 50 through the center 28 of ball at an angle to the roll axis 26, tending to laterally displace ball 16. This causes the race load forces 30 and 32 to be applied off-center of ball 16, as seen at 52 in FIGS. 4, 5 and 6. This off-center force 52 produces a torque about the center 28 of ball 16, causing the ball 16 to rotate away from wall 48 and, thereby, relieving the friction between ball 16 and cage 8. This rotation also serves to alter the orientation of ball 16 which reduces the likelihood that ball 16 will re-engage wall 48 of aperture 42 at precisely the same contact point. Hence, wear will be distributed along wall 48 and the service life of cage 8 and ball 16 will be greatly extended. It will be seen from FIG. 5 that as the wall 48 drives ball 16 laterally away from the roll axis 26, the application point 52 of the race load forces will be moved farther away from the center 28 of the ball 16 and, hence, the stronger will be the torque tending to rotate ball 16 away from wall 48.

FIG. 7 shows an alternative form of the present invention. In this form, cage 8 is formed with a plurality of circular apertures 56, 58 and 60, each having its center laterally offset from the roll axis 26, as seen at 62, 64 and 66. It will be apparent that walls of the eccentric apertures 56, 58 and 60 will engage balls 16, 18 and 20 at an angle to the roll axis 26 and will serve to cause a rotating torque to be developed in the balls 16, 18 and 20, in the manner described above with respect to the triangular apertures of FIG. 4.

Obviously, numerous variations and modifications can be made without departing from the present invention. Accordingly, it should be clearly understood that the forms of the present invention described above and shown in the accompanying drawings are illustrative only and are not intended to limit the scope of the invention.

What is claimed and desired to be secured by Letters Patent of the United States is:

1. A ball bearing assembly comprising:
   first and second race members, each formed with a concave ball engaging surface and cooperating to define a path of movement for balls located therebetween, said concave surfaces imparting torques to any ball which is displaced laterally from said path of movement, said torques tending to return said displaced ball to said path of movement;
   a plurality of balls located between said race members; and
   a cage member interposed between said race members having a plurality of triangular apertures formed therein, each containing a respective one of said balls and configured to displace the ball contained therein laterally from said path of movement upon contact between the respective ball and said cage member.

2. The ball bearing assembly of claim 1 wherein the apexes of adjacent ones of said apertures are oriented in alternate directions.

* * * * *